United States Patent [19]

Helton

[11] 4,200,324
[45] Apr. 29, 1980

[54] SHOVEL WITH IMPROVED LIFTING MEANS

[76] Inventor: Wayland Helton, 1351 Nordyke Ave., Indianapolis, Ind. 46221

[21] Appl. No.: 916,140

[22] Filed: Jun. 16, 1978

[51] Int. Cl.² .......................... A01B 1/22; B25G 3/38
[52] U.S. Cl. .................................................... 294/58
[58] Field of Search .............................. 294/54, 57–59; 16/114 R; 37/53; 224/5 B; 403/76, 90; 15/143 R, 144 R, 144 A, 145

[56] References Cited

U.S. PATENT DOCUMENTS

| | | | |
|---|---|---|---|
| 617,206 | 1/1899 | Tveit et al. | 403/90 |
| 2,430,802 | 11/1947 | Catlin | 294/58 |
| 2,521,441 | 9/1950 | Bickley | 294/58 |
| 2,826,835 | 3/1958 | O'Shea | 294/58 X |
| 3,866,257 | 2/1975 | Cansdale | 15/144 R X |
| 4,050,728 | 9/1977 | Davidson | 294/58 |

FOREIGN PATENT DOCUMENTS

| | | | |
|---|---|---|---|
| 1041062 | 10/1953 | France | 294/59 |
| 1466913 | 3/1977 | United Kingdom | 294/58 |

*Primary Examiner*—Johnny D. Cherry
*Attorney, Agent, or Firm*—Woodard, Weikart, Emhardt & Naughton

[57] ABSTRACT

A shovel with improved lifting means includes a blade portion, a handle member and a lifting bar. The blade portion has a material-transporting surface and an opposite side rear surface to which one end of the handle is rigidly attached. The lifting bar is attached to the material-transporting surface by a ball and socket connection and extends in length approximately two feet from its point of pivotal attachment. The length of the lifting bar is slightly less than the length of the handle such that the user of the shovel may stand in a substantially upright position and push the shovel forward by means of the handle to collect material on the material-transporting surface, while holding the end of the lifting bar. Once material is collected on the material-transporting surface, the user lifts up on the lifting bar in combination with the handle member in order to move the collected material to another location.

3 Claims, 7 Drawing Figures

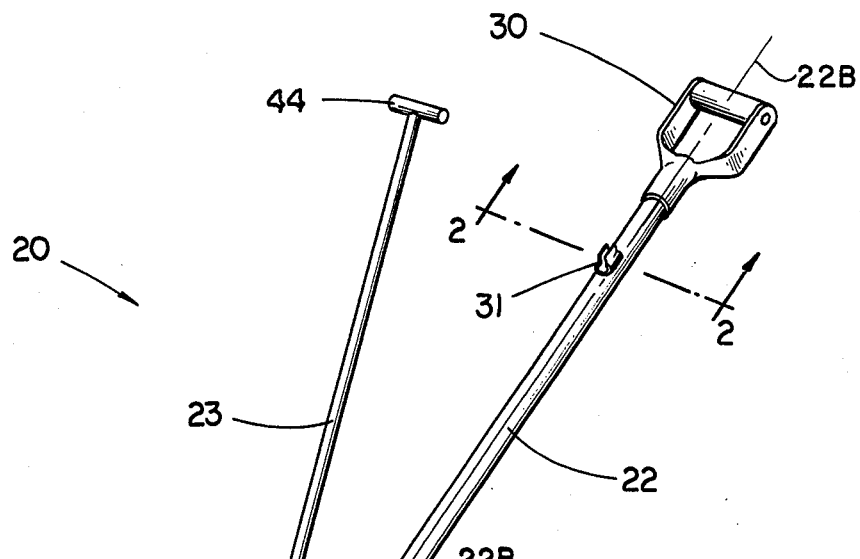
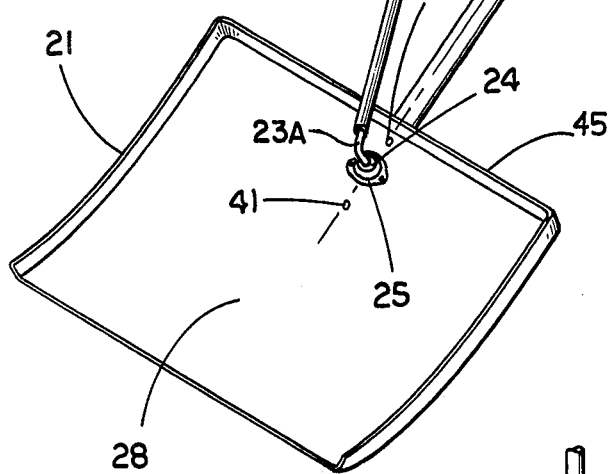
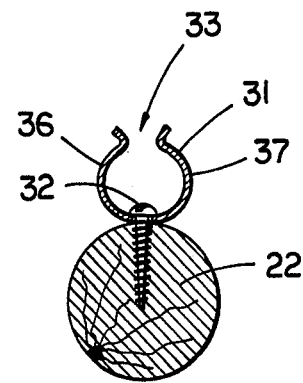
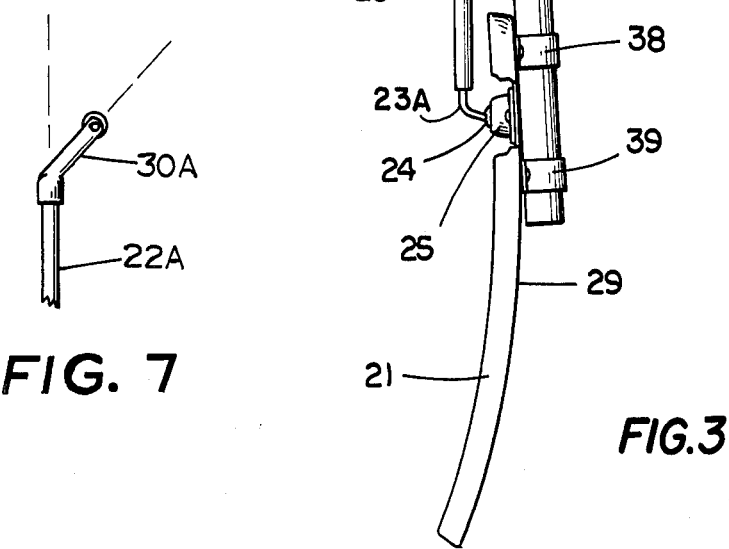
FIG. 1
FIG. 2
FIG. 7
FIG. 3

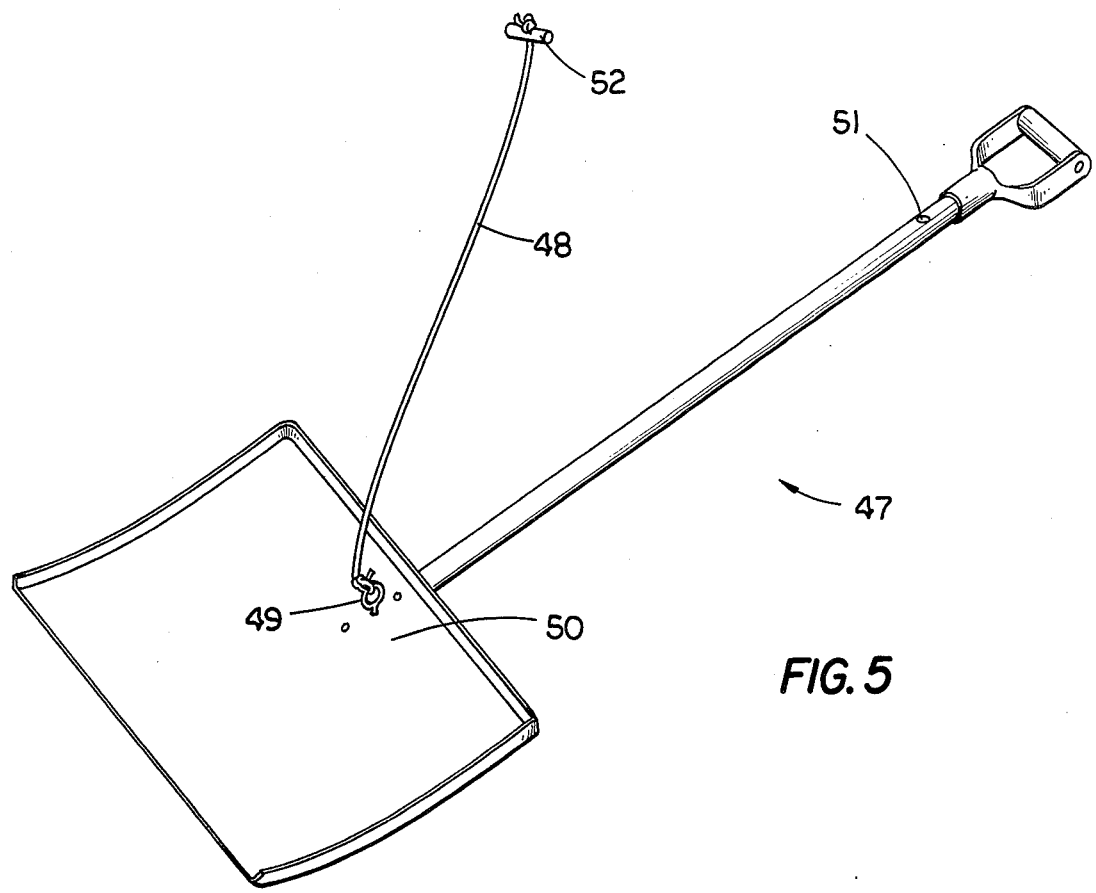
FIG. 5
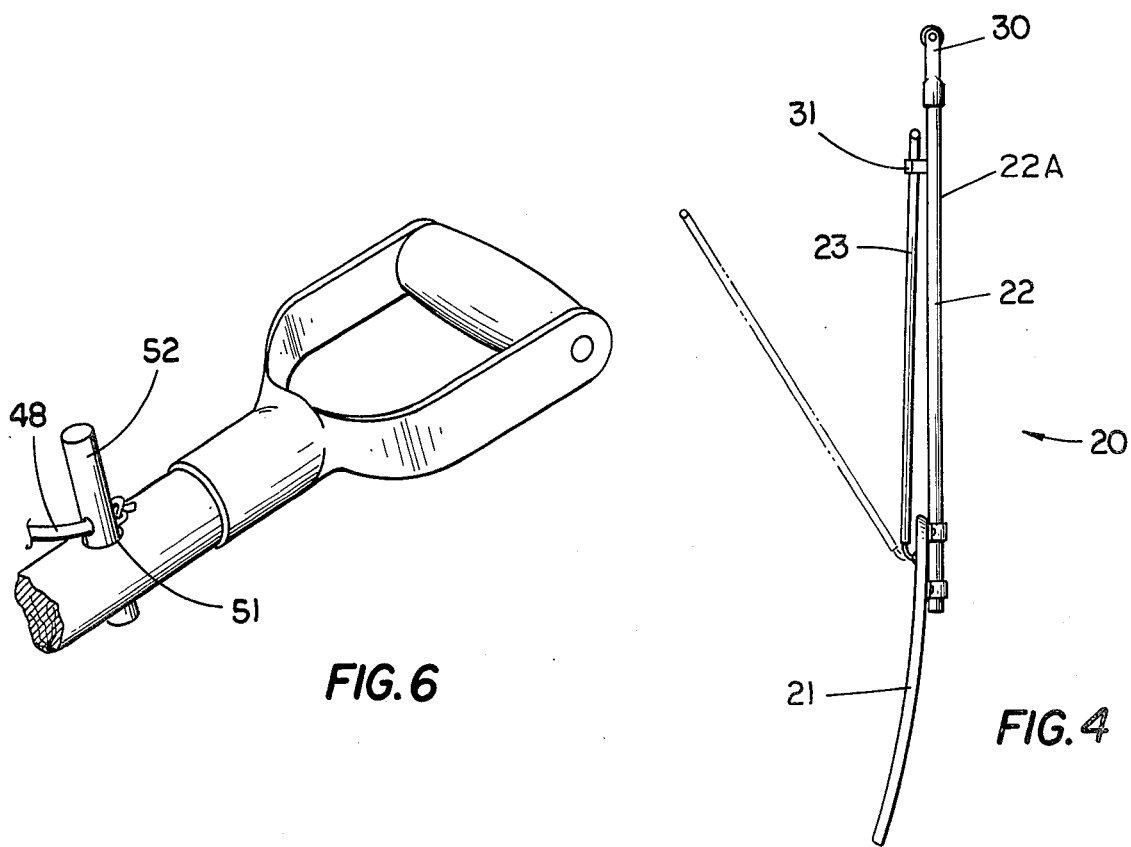
FIG. 6
FIG. 4

SHOVEL WITH IMPROVED LIFTING MEANS

BACKGROUND OF THE INVENTION

This invention relates in general to shovels and in particular to shovels with auxiliary lifting aids.

Shovels, such as for example, snow shovels, are a combination of a blade and handle arranged so that to effectively use the shovel, the handle must be grasped at two spaced apart locations and the user must bend over to such degree that the user's upper body is almost horizontal with respect to the ground. This particular user position results in significant strain to the lower back area and in addition to more rapidly tiring the user, this strain, may accelerate back injuries or aggravate preexisting injuries. A further disadvantage of such conventional snow shovel designs is that the handle is round and the blade is wide and extends for several inches on either side of the handle, and when material is loaded onto the blade, balancing of the load becomes quite difficult. A still further disadvantage is that the hand of the user which is positioned closest to the blade is twisted when the load on the blade is to be dumped and this twisting places a severe strain on the wrist. In an effort to overcome certain shortcomings and to improve aspects of snow shovel designs, the following list of patents disclose design features which have been conceived.

| Patent No. | Patentee | Issue Date |
| --- | --- | --- |
| 61,784 | Wheat | 2/05/67 |
| 389,092 | Mercer | 9/04/88 |
| 3,751,094 | Bohler | 8/07/73 |
| 606,534 | Gifford | 6/28/98 |
| 930,660 | Gifford | 8/10/09 |
| 2,967,363 | Meier | 1/10/61 |
| 781,772 | Gifford | 2/07/05 |

Wheat discloses a snow shovel design wherein a short secondary or auxiliary handle is locked to the body of the shovel by means of the ordinary handle. The short auxiliary handle includes an opening for easy grasping and is rigidly attached adjacent one end of the blade, but is not attached directly to the blade.

Mercer discloses a snow scraper which may also serve as a snow shovel and a secondary grip means is provided along the back edge of the blade portion in addition to the cross bar member which serves as the primary means for pushing the snow scraper device.

Bohler discloses an auxiliary handle which is readily securable to a regular handle of an implement such as a shovel, rake or hoe and is designed to be grasped by a person's one hand while the person's other hand grasps the regular handle.

Gifford U.S. Pat. No. 606,534 discloses a snow shovel design which includes an auxiliary hand-grip attached to the regular handle at a location which is spaced apart from the rear edge of the shovel blade portion.

Gifford U.S. Pat. No. 930,660 discloses a snow shovel which includes an adjustable lift handle attached to the main handle portion of the shovel. This particular handle member is similar in design and location to the handle member of the previously listed Gifford U.S. Pat. No. 606,534 and as such, is positioned close to the rear edge of the blade portion of the shovel and extends in length for only a few inches. Thus, the user of such a shovel, as well as the previous Gifford designed shovel, must bend forward and over the shovel in order to grip both the auxiliary handle as well as the primary handle.

Gifford U.S. Pat. No. 781,772 discloses a snow shovel similar in design and construction to the previously two listed Gifford patents and includes a similarly styled auxiliary handle. Although there may be patentable differences between the three Gifford patents, the features which are relevant to the present invention are the size, location and construction of the auxiliary handle, and the designs disclosed do not overcome the disadvantage of having to bend at the waist to almost a horizontal position with respect to the ground in order to utilize the particular shovels.

Meier discloses a manually operated snow plow which includes a handle bar attached to the blade in such a manner that the blade may be adjusted to various angular positions with respect to the handle bar.

While some of the above-listed patents provide gripping means at a second, or auxiliary gripping location space apart from the free end of the primary handle, none of the above patents provide means by which the disadvantage of requiring the user to bend sharply at his waist may be overcome and thus, it would be an improvement to these designs if such means could be provided. Furthermore, none of the above-listed patents disclose an auxiliary handle which attaches directly to the material-transporting surface of the blade portion which reduces the moment arm between the weight and the point of lifting force and makes the load seem lighter.

SUMMARY OF THE INVENTION

A shovel according to one embodiment of the present invention comprises a blade portion having a handle secured to the blade portion and means for lifting the blade portion attached directly to the blade portion.

One object of the present invention is to provide an improved shovel of the type having auxiliary lifting means.

Related objects and advantages of the present invention will be apparent from the following description.

BRIEF DESCRIPTION OF THE DRAWINGS

FIG. 1 is a perspective view of a shovel with auxiliary lifting means according to a typical embodiment of the present invention.

FIG. 2 is a section view of a retaining clip comprising a portion of the FIG. 1 shovel and taken along line 2—2 in FIG. 1.

FIG. 3 is a partial side view of the FIG. 1 shovel detailing a ball and socket connection which comprises a portion of the FIG. 1 shovel.

FIG. 4 is a side elevation view of the FIG. 1 shovel illustrating movement of an auxiliary handle which comprises a portion of the FIG. 1 shovel.

FIG. 5 is a perspective view of an alternate form of a shovel according to a typical embodiment of the present invention.

FIG. 6 is a partial perspective view of the handle of the FIG. 5 shovel.

FIG. 7 is a partial side elevation view similar to FIG. 4 of an alternative embodiment of the present invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a shovel 20 which is similar in size, shape and general configuration to a snow shovel. Shovel 20 includes a blade portion 21, a primary handle member 22, auxiliary lifting means in the form of rigid bar 23 and a ball 24 and socket 25 connection joining one end of rigid bar 23 to blade portion 21. Blade portion 21 includes a front edge, a rear upturned edge and two upturned side edges. Socket 25 is rigidly secured to the material-transferring outer surface 28 of blade portion 21 at a location coincident with the longitudinal axis 22B of handle 22 and adjacent the rear edge of the blade portion by a suitable metal-to-metal joining technique such as, for example, welding. One end of handle member 22 is rigidly attached to the opposite, rear surface 29 of blade portion 21 and includes a free end hand grip 30 which is typically grasped by one hand of the user of the shovel. Securely attached to handle member 22 at a location which is adjacent hand grip 30 is a bar-retaining clip 31 (see FIG. 2) which is fastened to handle member 22 by means of two fasteners 32. The open region 33 of retaining clip 31 is suitably sized widthwise and depthwise to receive rigid bar 23. Clip tabs 36 and 37 are constructed of a material which has certain spring properties to it and are positioned relative to each other such that they must be slightly forced apart as bar 23 is pushed into open region 33.

Handle member 22 is attached to the rear surface 29 of blade portion 21 by means of retaining brackets 38 and 39, and although brackets 38 and 39 may be all that comprises the attaching means, it is preferred to also incorporate threaded fasteners 40 and 41 extending through blade portion 21 into handle member 22 (see FIG. 3). A single sleeve may be used in lieu of brackets 38 and 39, such that handle member 22 would slide into the sleeve and be secured by fasteners. The ball and socket connection of bar 23 to surface 28 enables bar 23 to be moved a maximum of 180 degrees in any direction such that the cumulative result of the motion of bar 23 would be the sweeping out of a hemispherical shape. Bar 23 is joined to ball 24 by means of a generally L-shaped neck member 23A which is of a reduced lateral cross-sectional area with respect to bar 23. Member 23A is formed into two portions wherein when bar 23 is in a folded position against handle 22, one portion is substantially perpendicular to the longitudinal axis 22B and the other portion is substantially parallel to axis 22B. However, due to the particular application for shovel 20, primary movement of bar 23 will be between a folded position parallel to handle member 20 and an extended position (see FIG. 4) wherein bar 23 pivots away from handle member 22 and defines an acute included angle with handle member 22. Secondary movement will be in a left or right pivoting direction from the extended position, such as required to dump material off of surface 28.

In normal operation, such as when shoveling snow, one hand of the user will grasp hand grip 30 and the other hand of the user will grasp T-shaped cross bar 44 at the free end of bar 23. When snow is being removed from a sidewalk or driveway or similar surface, the hands of the user will typically be in line with one another and substantially parallel with the axis of handle member 22. In this particular mode, a basic hinge arrangement would be suitable to connect rigid bar 23 to surface 28. However, once surface 28 is loaded with collected material, such as snow, the material must be removed to a remote location and dumped so that surface 28 can be emptied and returned to a ready condition in order to pick up additional material. When such dumping is to occur, a basic hinge arrangement would require that both hands of the user turn with the shovel and this puts a twist in and strain on the wrist of the hand grasping cross bar 44. Consequently, the inclusion of a ball 24 and socket 25 connection permits the hand grasping cross bar 44 to remain in a palm-down orientation while the other hand which is grasping hand grip 30 performs the twisting and dumping thereby allowing the ball and socket location to be the pivoting point for such twisting-dumping motion.

Rigid bar 23 is approximately 26 inches in length from its ball and socket point of attachment to cross bar 44 and is slightly shorter than the length of handle member 22 from blade portion edge 45 to hand grip 30. This 26-inch length is based on a handle design which is approximately 29 inches in length and thus, it is preferred that the length of rigid bar 23 be at least 80% of the length of handle member 22. This enables the user of shovel 20 to stand in a substantially upright position with one arm extended downwardly and with the hand of the downwardly extending arm grasping hand grip 30 while the opposite arm extends outwardly in the direction that the shovel is moving and grasps cross bar 44. This user position relieves the strain on the lower back as well as reduces shoulder and upper arm exertion in that the ball and socket connection and the presence of bar 23 enables snow to be removed with primarily only lifting and wrist pivoting actions and without bending at the waist.

Referring to FIG. 5, shovel 47 illustrates an alternate form wherein rigid bar 23 is replaced by a length of flexible material, such as rope 48. One end of rope 48 is attached to eye bolt 49 which may be either bolted to surface 50 or the head portion of eye bolt 49 may be welded to surface 50. The retaining clip which was previously positioned on the handle member has been replaced by a clearance hole 51 similarly disposed at the free end adjacent to the handle grip. The free end of rope 48 includes a wooden cross member 52 through which rope 48 passes. Cross member 52 provides a convenient gripping means for the hand of the user and when rope 48 is not being used as an auxiliary lifting means, cross member 52 may be inserted into clearance hole 51 (see FIG. 6) as a means of storage and retention. Rope 48 has an overall length similar to that of bar 23 such that the user orientation of a substantially upright position when using shovel 20 would be equally applicable with either rigid bar 23 or with rope 48. It is also possible to provide both rigid bar 23 and rope 48 as part of the same device such that either auxiliary means could be used and one could be employed as a backup. Referring to FIG. 4, it can be seen that the hand grip 30 is arranged in the illustrated preferred embodiment as aligned with the shank portion 22A of the handle member 22. This is the preferred arrangement of the shovel. However, the shovel can also be constructed with the hand grip 30A at approximately 45 degrees to the shank portion 22A as shown in FIG. 7 as well as at other angles.

It is to be understood that although a snow shovel has been illustrated, the various features of the disclosed invention are equally well suited to virtually every type of shovel design and although various materials and connection techniques are possible, the optimum materials and dimensions will depend in part on the basic shovel style and size as well as its intended application.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a shovel having a blade portion and a handle secured to said blade portion;

auxiliary lifting means connected to said blade portion and cooperatively arranged with said handle for lifting said blade portion, said blade portion including an outer surface and an oppositely disposed rear surface, said handle being secured to said rear surface;

means for attaching said auxiliary lifting means to said outer surface, said attaching means including a ball member and a socket member arranged into a ball and socket connection;

said auxiliary lifting means including a rigid bar having gripping means at one end and a neck member extending from the opposite end, said neck member joining said opposite end to the ball member of said ball and socket connection; and said neck portion is substantially L-shaped into two portions and is of a reduced lateral cross-sectional area compared to said rigid bar.

2. The combination of claim 1 wherein when said rigid bar is in a folded position against said handle, one of said neck member portions is disposed substantially perpendicular to the longitudinal axis of said handle and the other portion is disposed substantially parallel to said axis.

3. The combination of claim 2 wherein said rigid bar extends in length a distance equal to at least 80 percent of the overall length of said handle.

* * * * *